Aug. 11, 1959 R. W. WIRTZ ET AL 2,898,829
ELECTRICAL INDEXING APPARATUS FOR PHOTOCOMPOSING MACHINE
Filed June 24, 1958 10 Sheets-Sheet 1

Inventors
Robert W. Wirtz
Harold B. Ratcliff
John S. Turner, Jr.
By: Kegan and Kegan Attys.

Inventors
Robert W. Wirtz
Harold B. Ratcliff
John S. Turner, Jr.
By: Kegan and Kegan Attys.

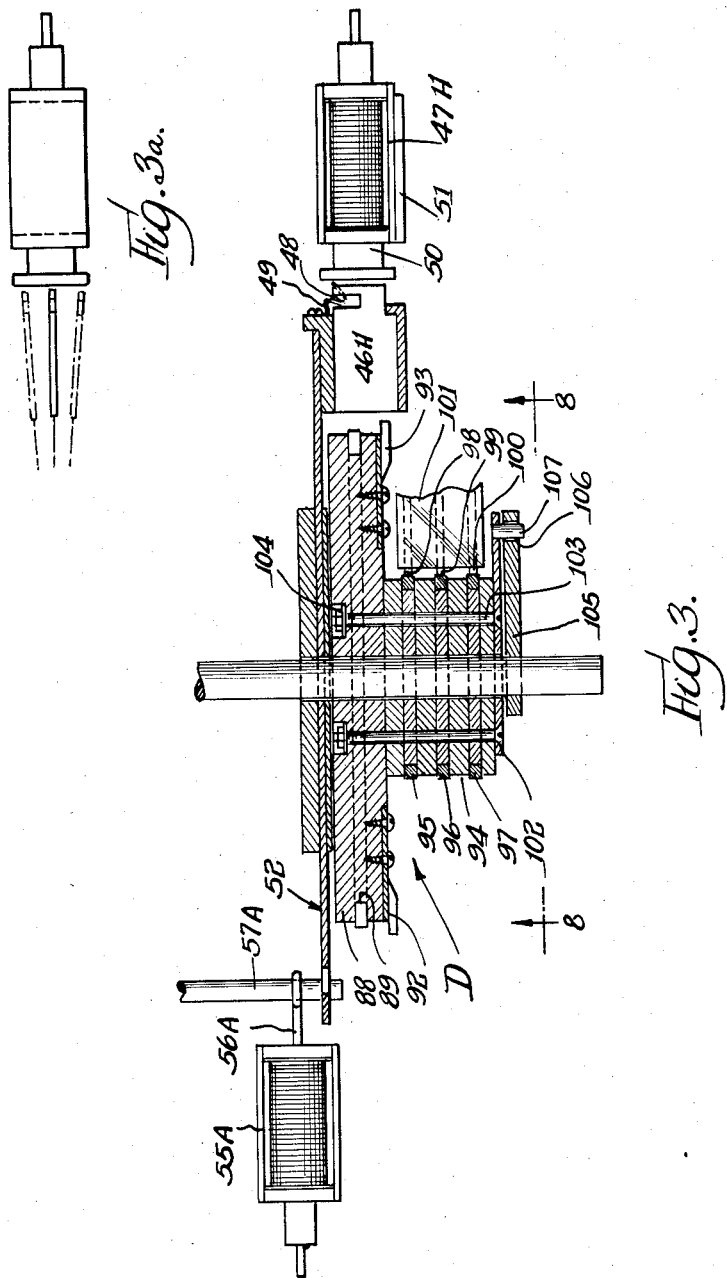

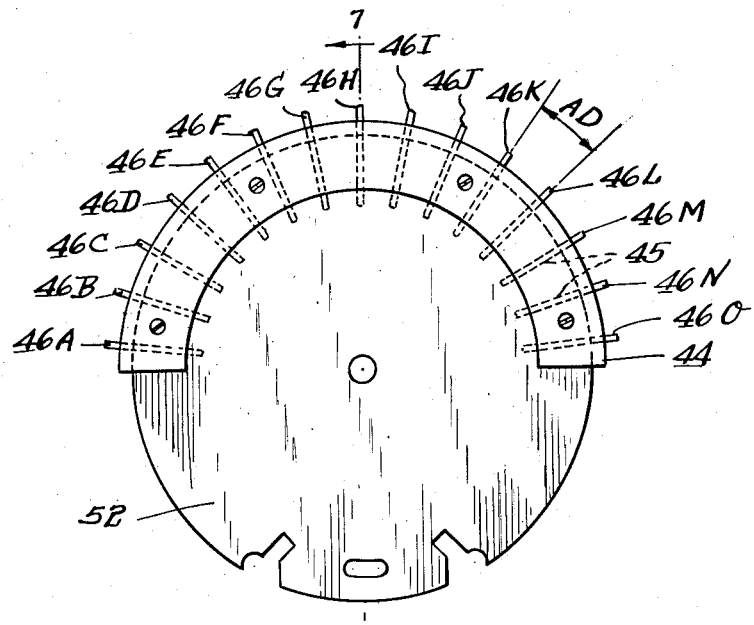

Inventors
Robert W. Wirtz
Harold B. Ratcliff
John S. Turner, Jr.
By:— Kegan and Kegan attys

2,898,829

ELECTRICAL INDEXING APPARATUS FOR PHOTOCOMPOSING MACHINE

Robert W. Wirtz, Watchung, N.J., Harold B. Ratcliff, Peoria, Ill., and John S. Turner, Jr., Fort Worth, Tex., assignors to Wirtz Company, Watchung, N.J., a co-partnership Application June 24, 1958, Serial No. 744,292

36 Claims. (Cl. 95—4.5)

This invention relates to the art of printing, to apparatus for automatically indexing selected characters for printing, and to an automatic electrical indexing mechanism for positioning a type font or matrix to reproduce characters corresponding to characters selectable by actuation of keys on a standard typewriter keyboard. This application is a continuation-in-part of application Serial No. 519,464, filed July 1, 1955, now abandoned.

The invention has particular applicability in machines wherein a photographic matrix is used to photographically project single characters to a light-sensitive paper or film to thereby produce a photographic copy of text material which can then be used in any suitable reproduction process, such as photo-lithography. In such machines, the characters are arranged on a single font or matrix which permits them to be projected onto the light-sensitive paper or film. The movement of the matrix, in turn, is governed by selecting the desired character to be photographed and actuating the selecting means.

In the hitherto known machines, however, the actuation of the selecting means has required rigid mechanical connections to be made between the matrix positioning mechanism and the character selecting means. This may result in relatively slow operation due to the inertia of the mechanical parts, and in practice also has been found sometimes to result in inaccurate positioning of the matrix due to the considerable lost motion and inaccuracies which may occur in such rigid mechanical connections. Inaccurate matrix positioning, of course, may result in a photographic copy of the text material having such undesirable qualities as blurred printing and overlapping and misalignment of characters.

Other machines require complex working mechanisms having distinct indexing combinations for each character. Such machines not only have a relatively high original cost, but are difficult to maintain and operate.

Accordingly, it is an object of this invention to overcome these and other difficulties resulting from the use of known indexing mechanisms.

It is a main object of this invention to provide an electrical indexing mechanism for accurately positioning a type font or matrix having a set of characters thereon for reproducing characters corresponding to the characters on a standard keyboard, there being no rigid mechanical connections between the selecting keys and the indexing mechanism. With such an arrangement, character selection may be effected distinctly apart from character reproduction, with the selecting and reproducing stations even being separately located.

Another object of this invention is to provide an indexing mechanism means which assures accurate positioning of the selected matrix character. The mechanism so provided further assures reliable and rapid operation, requiring a minimum amount of effort on the part of the operator, since all the operator need do is proceed to type or select characters on the pilot machine as he ordinarily would do if the indexing mechanism were not employed.

Another object of this invention is to provide a captive device, adapted to be operated by any key actuated parent machine, for selecting items corresponding to each key in the parent machine.

More specifically, an object of this invention is to provide an automatic electrical indexing mechanism which may be employed in a photocomposing machine to position a photographic matrix having a set of characters thereon for photographic exposure, and further to provide means for actuating the photocomposer and indexing mechanism whereby a standard typewriter is used as a pilot machine to control the sequential operation of the photocomposer for exposing selected characters to film.

Also, it is an object of this invention to provide an indexing mechanism which is capable of affording a maximum number of indexing locations, so that the indexing apparatus is adapted to be used with various typewriters having variable amounts of character keys.

An important feature of this invention is the provision of a small number of positioning means which are capable of establishing a large number of indexing locations, whereby the matrix may be stopped at any one of the locations to selectively position a character thereon for reproduction.

Still a further object of this invention is to provide a unique indexing mechanism which assures accurate indexing of selected matrix characters without having to return to a "home" position after each character reproduction, thereby also enabling more rapid production of the text material being reproduced. In this connection, it is an associated object of this invention to provide means whereby indexing travel between successive characters is always by the shortest route.

Another important feature of the invention is to provide electrical circuitry so constructed as to enable a small number of positioning means to predetermine a large number of indexing locations. To this end a series of combinations of electrical means and circuits is provided, whereby actuation of a keyboard character key is effective to select the circuits necessary to determine the indexing location associated with the actuated key.

And, another feature of the invention is to provide electrical means for assuring completion of the reproducing cycle for a selected character, even though the actuated character-selecting key is released prior to the completion of the print cycle. Moreover, if an actuated selecting key is held down over an extended period, the electrical means prevents repeat reproduction of the selected character.

The invention may be employed wherever it is desired to eliminate mechanical indexing connections between a pilot machine and the device operated thereby. One example of a use for the apparatus disclosed herein is in our patent application for Photocomposing Apparatus, Serial No. 485,936, filed February 3, 1955, now abandoned, whereby the mechanical linkage between the photographic character font and pilot typewriter may be eliminated. It will be obvious to persons skilled in the art, of course, that the invention disclosed herein may be readily employed to index any machine having a movable character-bearing font or shuttle. Thus, it may be used to index the type shuttle in a standard typewriter of the kind commercially available under the trademark "Varityper."

In accordance with the teachings of the present invention, it is contemplated that a standard typewriter keyboard is used therewith for character selection. However, it is to be understood that the solution of problems encountered in designing the present invention enables the new apparatus to be actuated by any keyboard having a set of keys available for selecting characters to be reproduced. Depression of any key, while causing printing of the character also, initiates a series of sequential steps which ultimately lead to the photographing of a corresponding exposure character. Following the reproduction of a selected character, the apparatus is automatically reset to reproduce the succeeding character. Since the pilot typewriter produces a copy of that which is being photographed in the photocomposing apparatus, the operator is able to see what is being reproduced at all times.

In accomplishing the objectives generally set forth above, there are provided in the invention a movable matrix having characters thereon corresponding to the characters selectable on the typewriter keys. It is understood, of course, that the term matrix, as used herein, extends and applies to any device from which characters may be reproduced by shifting the device to specific predetermined positions. As disclosed herein in a specific embodiment, the matrix may be used to photograph characters thereon to thereby photographically reproduce printed matter.

A series of indexing devices, such as solenoids and cooperating stops, are so arranged and operable as to be capable of stopping a movable indexing device, which controls positioning of the matrix, in any one of a number of positions. The number of positions in which the indexing device may be stopped depends upon the number of lower case letters and symbols and upper case letters and symbols available for selection on the keyboard of the pilot typewriter. The stops serve a dual function. First, when projected forward after a character key is depressed, a stop is engageable with either of a pair of electrical directional contact members which act to determine the direction of movement of the indexing device. Second, as the indexing device is moved, it contacts the actuated stop, after which the matrix is disconnected from its positioning drive and is locked accurately in position to photograph the exposure character corresponding to the depressed character key. Once the matrix is accurately positioned, a shutter solenoid or other device is energized to trip the shutter and complete the exposure of the selected character. Thereafter, the entire apparatus is automatically reset in preparation for the next character selection operation.

When it is desired to print upper case letters or symbols, depression of the keyboard shift key reverses the electrical circuit connections for the directional contacts. Thus, contact by a solenoid actuated stop with a given directional contact, in turn, causes the positioning drive to move the matrix in the opposite direction until a second indexing device is brought into contact with the actuated stop, at which time the selected upper case exposure letter or symbol is positioned for photographing. It thus is evident that a single set of solenoids and cooperating stops serve to locate the matrix in exposure position for both upper and lower case letters and symbols, eliminating any necessity of separate sets of solenoids and stops for the upper and the lower case characters.

For a thorough understanding of the invention, its objects, advantages and features of construction, reference is made to the accompanying drawings, in which:

Figure 3 is a cross-sectional view taken approximately on line 3—3 in Fig. 2;

Figure 3a is a plan view of an indexing solenoid and its corresponding indexing stop bar, showing the three shift positions in which the bar may be positioned with respect to the solenoid;

Figure 6 is an inverted plan view of the apparatus for holding the positioning stops;

Figure 7 is a cross-sectional view taken approximately on line 7—7 in Figure 6;

*General organization*

Aside from specific modifications which are necessary for operating the mechanism comprising the present invention, the pilot typewriter machine 35 herein shown (Fig. 4) is generally similar to any well known standard keyboard typewriter. Since the standard typewriter is well known in the art and is described in many patents, only those parts which, together with their necessary modifications, are essential to the operation of the present invention, will be described.

Figure 5:
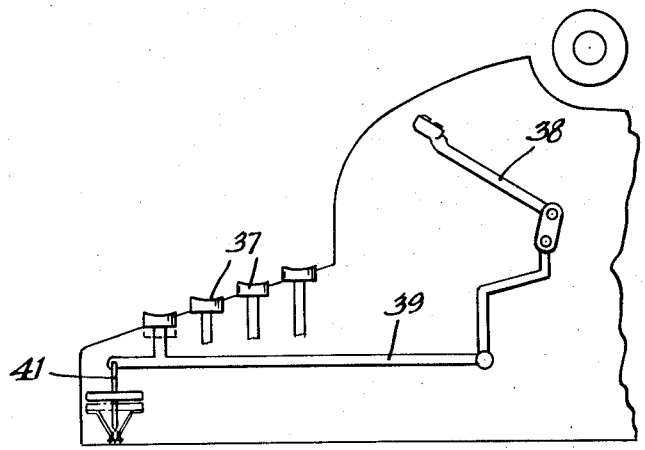
Figure 5 is a side cross-sectional view of the typewriter taken on lines 5—5 in Fig. 4 showing in a schematic way the electrical contacts controlled by the character keys.
Figure 4:
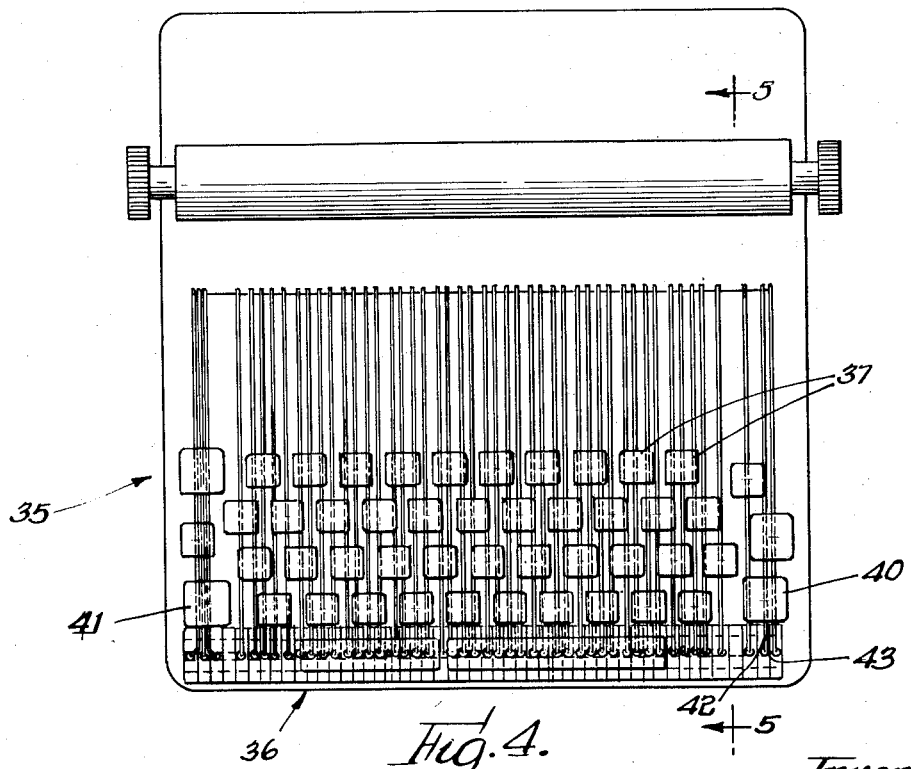
Figure 4 is a plan view of the pilot typewriter, showing only those parts which are used to operate the indexing mechanism.

Referring to Figures 4 and 5, the pilot typewriter 35 has a keyboard 36, comprising a plurality of character keys 37 for selection of each character which is to be reproduced, with each key being connected with a key bar 38 by a lever 39. Each lever 39 is further extended to the front of the typewriter. Also provided on the keyboard is the standard shift key 40 for shifting the key bar mechanism of the typewriter to print upper case characters.

The additions necessary in order to adapt the pilot machine 35 to the invention are few and those which are made are simple and inexpensive. Beneath each character key 37 there is added an arm 41 extending downwardly from the forward extension of lever 39. Each arm 41 controls the operation of a pair of electrical contacts, which when closed initiate an operating cycle for indexing a photocomposing matrix, as hereinafter explained. Beneath shift key 40 there is added a forwardly projecting lever 42 for controlling the operation of another set of electrical contacts 43, which when closed reverse the electrical circuits controlling the direction in which the matrix is to be moved, as also described hereinafter.

Figure 1:
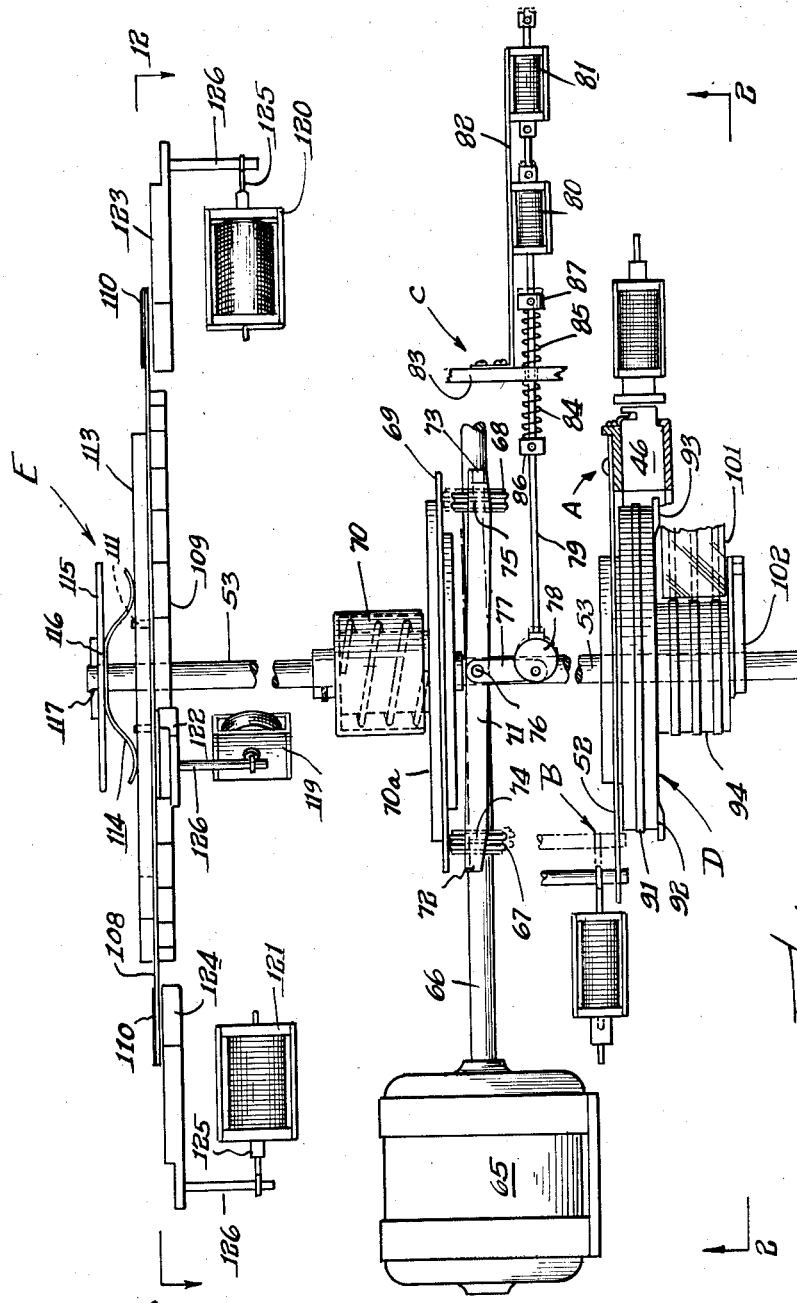
Figure 1 is a side elevation view of one embodiment of the invention with parts broken away in order to more clearly show the operating apparatus.
Figure 2:
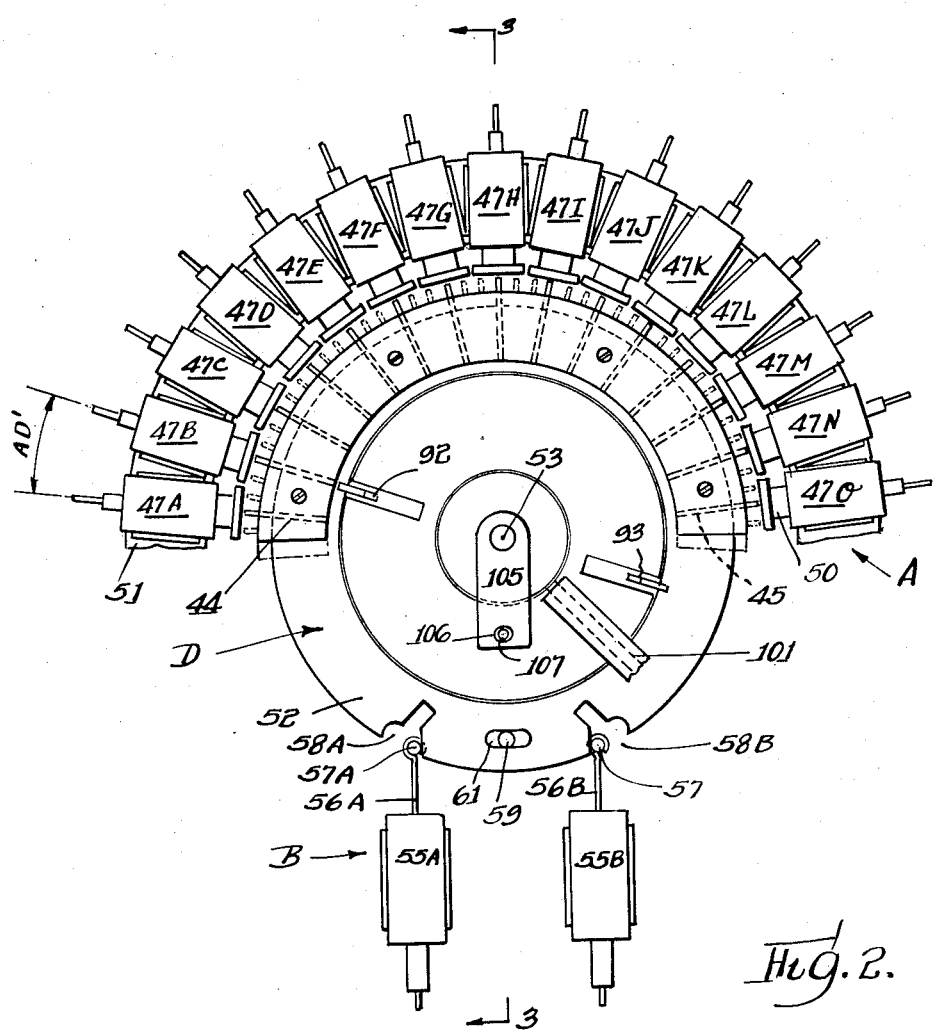
Figure 2 is an inverted plan view taken on line approximately 2—2 in Fig. 1.

Referring to Figures 1–3, among its features the invention further embodies a solenoid actuated stop assembly A comprising a plurality of individually solenoid actuated stops, here shown as fifteen in number, a shift mechanism B for setting the individual stops in any one of three positions, a drive assembly C, an indexing assembly D, and a matrix assembly E driven by assembly C and indexed by assembly D.

*Stop assembly*

As best seen in Figs. 2, 3, 6 and 7, stop assembly A includes an arcuate structure forming a housing 44 having fifteen radially extending passages 45 which are equally angularly spaced from each other by a center-to-center angular displacement AD, in this instance 12 degrees. Slidably held within each passage 45 is a stop bar 46, there being a total of fifteen bars, individually designated as 46A, 46B, 46C . . . 46O. Each bar is actuable by a corresponding solenoid 47, there likewise being a total of fifteen of such solenoids, individually correspondingly designated 47A, 47B, 47C . . . 47O. There, thus is one bar 46 and one corresponding solenoid 47 for each passage 45. Each of the solenoids 47 is provided with a plunger 50.

Adjacent the back end of each bar 46 a slot 48 is provided to accommodate a spring 49 mounted on housing 44 and adapted to normally position bar 46 out of the way of the indexing assembly D, as shown in Figs. 1–3. As plunger 50 is projected forward, when its respective solenoid is energized, it pushes the cooperating stop bar 46 forward. In turn, de-energization of the respective solenoid 47 permits spring 48 to return the bar 46 to its normal position, thereby pushing the cooperating solenoid plunger back to its initial position.

Solenoids 47 are also annularly and concentrically arranged about housing 44 so that travel by each plunger 50 is in a radial direction. Each solenoid 47 is angularly displaced from adjacent solenoids by a center to center angular distance AD' approximating the angular displacement between passages 45, or by about 12 degrees. A stationary base 51 is provided to mount all solenoids 47 thereon by any suitable means.

Stop shift mechanism

Figure 9:
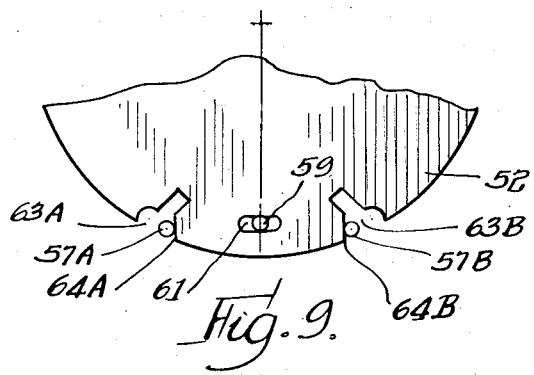
Figures 9, 10 and 11 are views showing three different positions which the stop holding apparatus of Figures 6 and 7 may assume.
Figure 10:
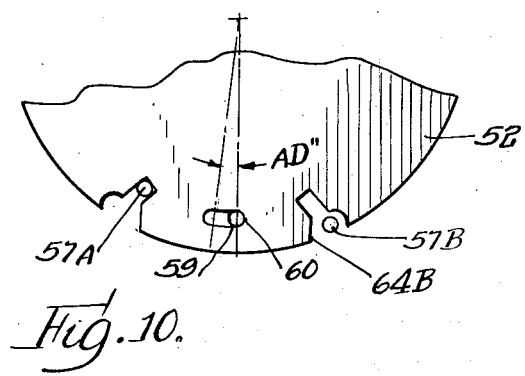

Referring in detail to Figs. 1–3, and 9–11, the shift mechanism B includes a disc 52 upon which housing 44 is concentrically mounted for rotation about shaft 53. A conventional collar 54 and sleeve 54a permit relative rotation between disc 52 and shaft 53. To rotate disc 52, and hence housing 44 together with stops 46, there are provided a pair of shift solenoids 55A, 55B. The plunger 56A of solenoid 55A carries an arm 57A adapted to engage a slot 58A extending inwardly from the peripheral edge of disc 52. Energization of solenoid 55A moves arm 57A into slot 58A, whereupon as arm 57A is projected forward it engages the side walls of slot 58A to rotate disc 52 clockwise, as viewed in Figs. 2 and 10. Rotation is continued until a stationary stop 59 is engaged by the end wall 60 of an arcuate slot 61 in disc 52, which is located equidistant between solenoids 55A, 55B and their respective plungers, and which is concentric with shaft 53. The angular displacement AD", as shown in Fig. 10, permitted by stop 59 before it is engaged by end wall 60 is approximately 4 degrees.

Figure 11:
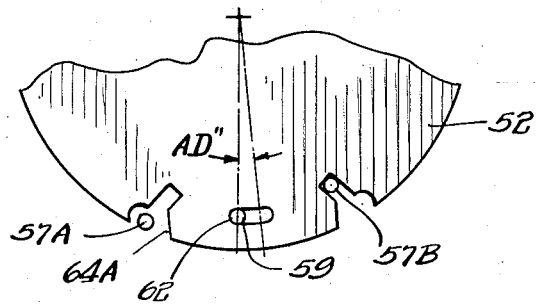

Likewise, the plunger 56B of solenoid 55B carries an arm 57B adapted to enter a slot 58B in disc 52. As plunger 56B is projected forward, arm 57B engages the side walls of slot 58B to rotate disc 52 counterclockwise, as viewed in Figs. 2 and 11. Similarly, this rotation is continued until stop 59 is engaged by the end wall 62 of slot 61, thereby limiting the counterclockwise rotation of disc 52 to an equal angle AD" of approximately 4 degrees, as shown in Fig. 11.

Each passage 58A, 58B has a substantially wide mouth 63A, 63B, respectively, enabling disc 52 to rotate relative to an inactive arm without interference therefrom. The adjacent sides, 64A, 64B, of each mouth, further, act as stop means to center disc 52, as shown in Figs. 2 and 9. Assuming that solenoid 55A has been energized, disc 52 then is positioned as shown in Fig. 10. De-energization of solenoid 55A causes arm 58A to retract and, in doing so, to rotate disc 52 in a counterclockwise direction. This return movement ceases when arm 57B is engaged by side 64B, at which time arm 57A continues in its linear travel until it again assumes its initial position, as shown in Figs. 2 and 9. De-energzation of solenoid 55B causes a similar, but opposite operation. That is, disc 52 rotates clockwise until arm 57A is engaged by side wall 64A.

Thus, it is seen that disc 52, together with housing 44 and stop bars 46, is positionable in any of three positions, with the angular displacement from either side of the center position of Figs. 2 and 9 being approximately 4 degrees. With fifteen stop bars 46, each of which is 12 degrees from adjacent bars, this gives a total of forty-five possible indexing positions, with the distance between adjacent positions being angularly equal, at 4 degrees. Figs. 2 and 3a show the bars 46 in centered positions, and also illustrate the alternative positions each bar may assume in dot-dash lines.

Figs. 1–3 reveal that angular movement of the stops 46 relative to plungers 50 is readily permitted, since there are no physical connections therebetween. Each solenoid plunger 50 carries a separate arm 50a which has a span sufficient to engage its respective bar 46 in any of the three positions assumed by the bar. Moreover, although disc 52, when displaced from its initial position, also displaces each bar 46 from radial alignment with its respective solenoid plunger 50, there is a sufficient radially aligned force component when the solenoid 47 is energized to project bar 46 forward.

Drive assembly

Referring to Fig. 1, drive assembly C comprises a drive motor 65 which runs continuously when the apparatus is being used, and a shiftable friction drive mechanism for selectively driving shaft 53 either clockwise or counterclockwise. The friction drive includes a shaft 66 extending from motor 65 and driven thereby, a pair of friction drive wheels 67 and 68, frictionally driven by shaft 66, and a turntable 69 mounted on shaft 53 and positioned thereon to be selectively engaged by either friction drive wheel. A spring 70, anchored to shaft 53 and acting on disc 70a, maintains a uniform pressure on turntable 69, whereby slippage between either actuated friction drive wheel and the turntable is prevented.

Friction drive wheels 67 and 68 are rotatably mounted on a lever 71, the ends 72, 73 of which are turned so as to locate the respective aligned shafts 74, 75 of the wheels on a line lying in a plane running through a diameter of the turntable and perpendicular thereto. Lever 71 is pivotally mounted at its center to a shaft 76 fixed to the apparatus framework (not shown). One end of an arm 77 is attached to lever 71; at the other end, arm 77 is connected, by means of yoke 78, to a rod 79 which rocks arm 77 to pivot lever 71, and hence engage either wheel 67 or wheel 68 with turntable 69.

A pair of solenoids 80, 81 are provided to shift rod 79 either to the left or to the right, as seen in Fig. 1. The solenoids, mounted on a bracket 82 attached to the apparatus framework 83, are aligned so that rod 79 extends therethrough. A pair of opposed springs 84, 85 are provided on rod 79, acting between collars 86, 87, respectively, and framework 83 to normally center rod 79 at such a position that neither wheel 67 nor 68 engages turntable 69.

Energization of solenoid 80 moves rod 79 to the left, as seen in Fig. 1, causing wheel 67 to engage turntable 69. Thus, as motor 65 turns shaft 66, friction wheel 67 is rotated by shaft 66, and in turn it causes turntable 69, and hence shaft 53, to rotate in a first direction. Similarly, energization of solenoid 81 moves rod 79 to the right, thereby causing wheel 68 to engage turntable 69 to rotate turntable 69 and shaft 53 in a direction opposite to the first direction. De-energization of the solenoids allows either stressed spring 84, 85, to return rod 79 and wheels 67, 68 to a neutral position.

Indexing assembly

Indexing assembly D comprises a cylindrically shaped insulating block 88 (Fig. 13) mounted on shaft 53 and having a grooved peripheral portion 89 wherein a pair of semicircular electrical directional contact segments 90, 91, are insulatingly mounted from each other. Each directional contact is so positioned as to be engaged by an actuated stop bar 46 when juxtaposed thereto. Mounted on the underside of block 88 are a pair of electrical contacts or indexing heads 92, 93, angularly displaced from each other by 180 degrees. The indexing heads 92 and 93 are each so positioned with relation to directional contacts 91 and 92 that an actuated stop bar 46 on one side of either indexing head engages one directional contact, while actuation of a stop bar on the other side of the same indexing head causes it to strike the other directional contact segment. Moreover, indexing heads 92, 93, are so connected in the operating circuit that, as they are rotated on shaft 53, engagement by either one of the indexing heads with an actuated stop bar 46 interrupts rotation.

Directly below block 88, a second generally cylindrical insulated slip ring block 94 is provided on shaft 53. Three electrical slip rings 95, 96 and 97, provided on block 94, are respectively engageable by corresponding stationary brush contacts 98, 99 and 100, held on a brush mount 101. Slip rings 95 and 96 are operatively connected to directional segments 90 and 91 respectively; slip ring 97 is operatively connected with the indexing heads 92 and 93.

Below slip ring block 94, a member 102 is provided on shaft 53. The entire assembly comprising insulating blocks 88 and 94, and member 102 is held together by conventional means, such as by bolts 103 and nuts 104.

Immediately below member 102, but spaced slightly therefrom, an arm 105 is fixed to shaft 53 as by means of a set screw 105a. Adjacent the outer end of arm 105 a slot 106 is provided, and a finger 107 depending from member 102 is engageable within slot 106. Members 89, 94 and 102, when assembled on shaft 53, are mounted for rotation relative thereto with finger 107 limiting this relative rotation to the amount of relative movement permitted by slot 106 wherein finger 107 is engaged, as more fully explained hereinafter.

Matrix and locking assembly

Figure 12:
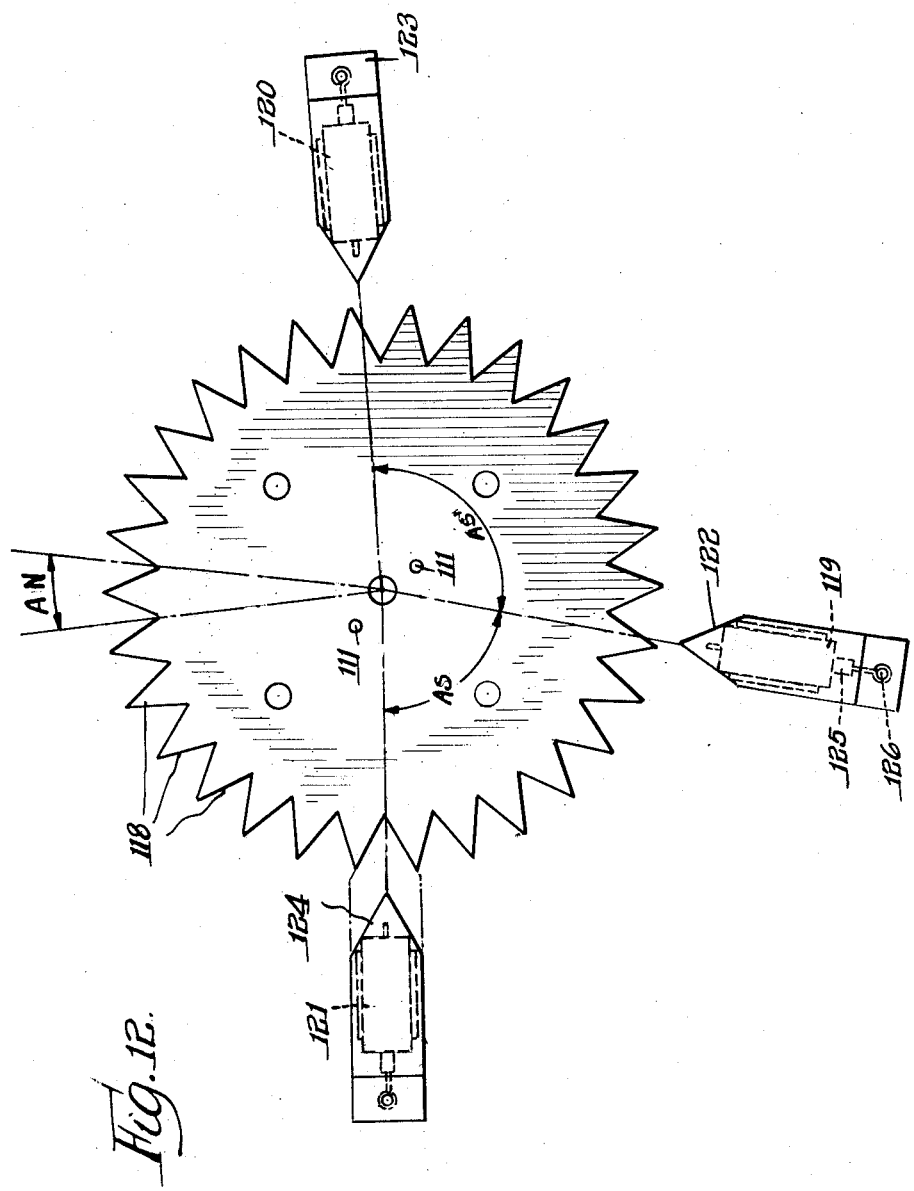
Figure 12 is a plan view taken approximately on line 12—12 of Figure 1.
Figure 15:
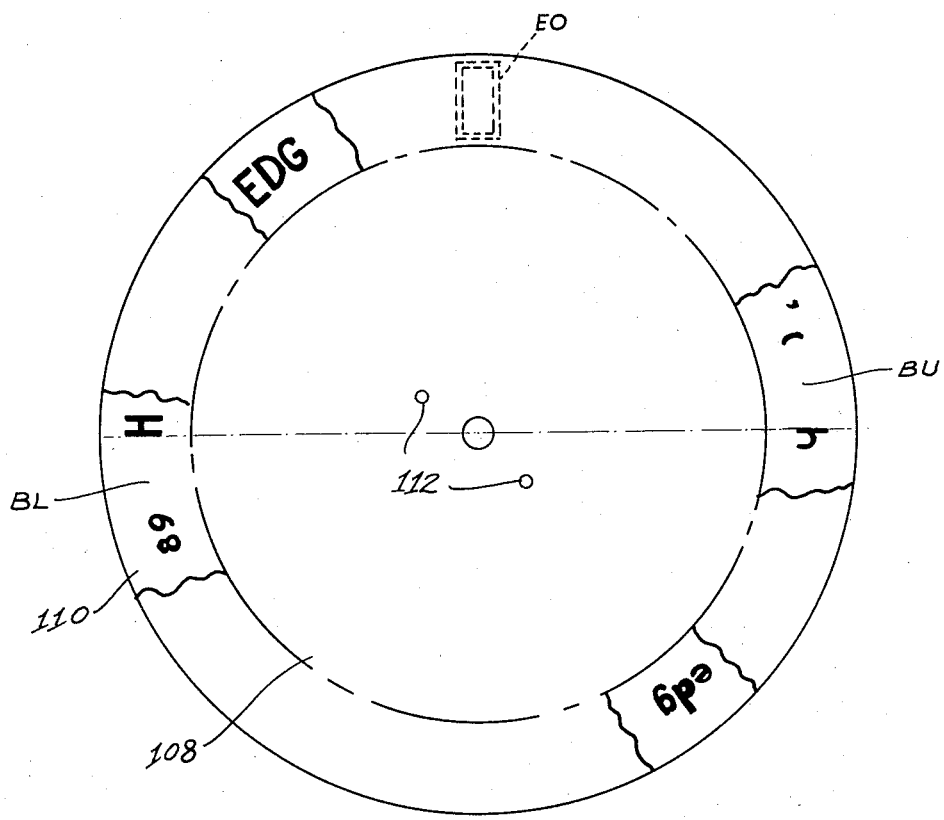
Figure 15 is a plan view of the matrix 108 of Figure 1.

As seen in Figs. 1 and 12, the matrix assembly E is located adjacent the upper end of shaft 53. An interchangeable photocomposing matrix 108, Figs. 1 and 15, having exposure characters thereon corresponding to the characters selectable on the typewriter character keys 37, is mounted on a locking disc 109 which is fixed to shaft 53 for rotation therewith. An exposure character is provided, on matrix 108, for each character selectable on the typewriter keys 37. The exposure characters are concentrically arranged about matrix 108 on a single opaque ring or band 110, Fig. 1, which is uninterrupted except for the various character faces. Band 110 and the characters therein may be formed by any suitable photographic process or by silk screening, with the outer surface protected by a suitable coating of transparent material in order to avoid accidental scratching or injury to the characters and thus preserve their reproduction qualities. When desired, of course, band 110 may be made transparent, with each character contrastingly made shaded or opaque, $90 \times 4° = 360°$ as indicated in Fig. 15. Assuming that there is a maximum of forty-five character keys 37, each capable of selecting two characters by alternative operation of shift key 36, band 110 must have thereon a character for each character capable of selection by operation of the keys 37, or a total of ninety characters. The characters are spaced from left hand base or slug lines according to their width requirements, there being a slug line for each character, with adjacent slug lines being uniformly angularly spaced by 4 degrees. When there are less than forty-five character keys, blank spaces may be left on matrix 108, as at BU and BL in Fig. 15, with the slug lines maintaining the same uniform distance as before. This is preferred to a redistribution of characters, since it allows one system or arrangement to be adaptable to typewriters having various numbers of character keys.

For reference purposes, exposure opening EO in the photographing apparatus (not shown) is shown in broken-line outline in Fig. 15.

Lock disc 109 has two eccentrically positioned dowel pins 111 engageable in mating holes 112 in matrix disc 108 in order to insure uniform alignment of all interchangeable matrix discs with the entire indexing mechanism. As shaft 53 rotates, locking disc 109 turns with it and, in turn, rotates matrix disc 108. A removable locking plate 113, insertable on shaft 53 and dowel pins 111, is supported on matrix disc 83 to hold it securely. A spring disc 114, held stressed on shaft 53 by a retaining disc 115 and a bar 116, holds the entire assembly in position while permitting quick change of matrices. To remove any matrix 108, all that need be done is slide bar 116 through the hole 117 in shaft 53 wherein it is held, thereby allowing the entire assembly to be disassembled. To reassemble, disc 114 is placed over plate 113 and compressed by disc 115, which is locked in position by reinserting bar 116 in hole 117.

Referring in particular to Figs. 1 and 12, locking disc 109 is provided with V-shaped notches 118 about its entire peripheral edge. Three latching solenoids 119, 120 and 121, having locking plungers 122, 123 and 124 respectively, joined to the respective solenoid plungers 125 by rods 126, are so positioned about disc 109 that any actuated plunger is engageable with the notch positioned before it to lock disc 109, and hence matrix 108, in position. Each plunger 122, 123, 124 is V-shaped so as to accurately engage notches 118.

The number of positions in which locking disc 109 may be locked in place corresponds to the number of characters selectable on the typewriter keys 37 and found on matrix 108. If there are ninety characters on matrix 108, disc 109 then is settable in ninety positions, since there is a separate position for each character on matrix 108. However, since there is difficulty in accurately indexing and locking ninety separate notches, it has been found best to provide some fractional number thereof, with each notch being much larger and thus easier to index. In practice it has been found that by displacing each notch 118 from adjacent notches by an angle AN of 12 degrees, thereby having thirty notches about disc 109, and by further arranging the plungers 122, 123 and 124 in a novel way, that is possible to achieve ninety distinct positions for disc 109.

To achieve this, plungers 122, 123 and 124 are annularly arranged about shaft 53 for movement radially thereto, with plunger 122 being displaced from plunger 124 by an angle AS of some multiple of 12 degrees, less 4 degrees. Plunger 123, further, is displaced from plunger 122 by an angle AS' of some multiple of 12 degrees plus 4 degrees. Thus, with thirty large notches, and three separate latching solenoids, disc 109 is capable of being locked in any one of ninety separate positions, each 4 degrees apart. The photographic exposure area is located so as to be accurately centered at one of the locking positions; matrix 108 and locking disc 109 are so arranged that as disc 109 is locked in one of the ninety positions, an exposure character on matrix 108 is accurately centered at the exposure area for photographing. Assuming, for the purpose of explanation only, that "A," "B" and "C" are three successive letters on matrix 108, to position letter "A" for photographing, solenoid 121 is energized to move plunger 124 and lock disc 109 and matrix 108 in place. In order to position the assembly to expose letter "B," it is necessary to advance 4 degrees, and thus solenoid 120 is energized to move plunger 123. It is, of course, obvious that to expose any of the three letters, the same notches 95 are approximately positioned before the respective plungers by rotation of shaft 53, and that the final positioning is achieved by energizing the proper latching solenoid 119, 120, or 121 in order to achieve accurate positioning and expose the desired letter. Which latching solenoid is energized depends upon the character key 33 depressed. It is also obvious that when there are less than forty-five character keys, the blank spaces left on matrix 108 are not positionable at the exposure area.

When assembled, the apparatus is arranged as shown in Figure 1, with drive assembly C situated between indexing assembly D at one end of shaft 53 and with the matrix and locking assembly E adjacent the other end of shaft 53. The solenoid actuated stop assembly A is mounted to shaft 53 for rotation relative thereto and is rotated by operation of shift assembly B. Mounted on shaft 53, and disposed within the arc formed by the solenoids in assembly B, the indexing assembly D is adapted to be engaged by any actuated solenoid plunger in assembly A to start the sequence of operation.

*Compensating operation*

Briefly, the operation of the indexing mechanism is as follows. Assuming that a character key 37 is depressed, actuating one of the stop bars 46, that drive motor 65 is energized, and that either solenoid 80 or 81 is energized to drivably connect motor 65 with shaft 53, the rotation of shaft 53 continues until one of the electrical indexing heads 92 or 93 engages the actuated stop bar 46, at which time the necessary electrical circuits are set up for locking matrix 108 in position with the desired character at the photographic exposure area.

Figure 8:
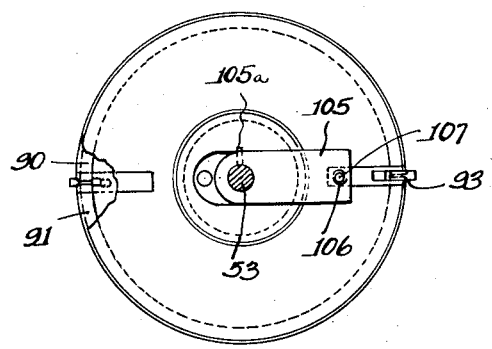
Figure 8 is an inverted view taken in the direction of the arrows 8—8 in Figure 3, with parts broken away to show the directional contact segments.

Ordinarily, if the indexing head striking the actuated bar 46 approaches the actuated stop bar 46 in a clockwise direction, tends to stop the indexing mechanism and matrix 108 in one position at the exposure area. If, however, the indexing arms were to approach the same actuated stop bar 46 from a counterclockwise direction, it would tend to stop the indexing mechanism and matrix 108 in an entirely different position at the exposure area. The difference in positions is caused by the width of the electrical indexing contacts 92 or 93 and by the thickness of the actuated stop bar 46. By using the compensating means shown in Figs. 1, 2 and 8, and by allowing limited relative movement between indexing heads and shaft 53, positioning of the character to be photographed is always at the same point, whether the indexing head approaches an actuated stop bar from a counterclockwise or from a clockwise direction.

After the indexing head 92 or 93 strikes the actuated bar 46, rotation of matrix 108 is continued for a short time. This additional rotation is effected by one of the latching solenoids 119, 120 or 121 causing its respective locking plunger to enter the notch 118 positioned before it. As the plunger enters the V-shaped notch 118 a final accurate positioning movement is imparted to locking disc 109 and matrix 108 to center the desired exposure character at the exposure area for photographing. It is understood, of course, that the exposure area itself is accurately centered on one of the ninety possible positions in which locking disc 109 may be held; so that final accurate positioning of a character on matrix 108 can be achieved only after the final positioning movement is effected by one of the latching solenoids.

While shaft 53 is being rotated to achieve this final positioning, the indexing contact which abuts the actuated stop bar 46 remains in engagement therewith, having no effect upon the movement of shaft 53, matrix 108 or disc 109, since the aforesaid relative movement is permitted between the indexing heads and shaft 53. The principle relied upon to always achieve this centering positioning is that at final positioning, a character slug line is always aligned with a set point at the exposure area. The ends of slot 106 further provide a means for limiting this relative movement between the indexing heads and shaft 53, since once a side of slot 106 abuts finger 107, the relative movement ceases.

*Case shift*

Summarizing, it is seen that the photographic exposure matrix 108 may have ninety characters formed into a circumferential character band. Each character is displaced from an adjacent slug line according to the width of the character, with the slug lines being uniformly spaced from each other by 4 degrees. Also, the locking disc 109 has thirty notches 118 uniformly arranged about its peripheral edge, with the notches 118 and latching plungers 122, 123 and 124, being capable of locking shaft 53 and matrix 108 in any of ninety uniformly spaced positions, 4 degrees apart, to thus form a circular matrix position pattern corresponding to the circular array of characters around matrix 108. When there are less than forty-five character keys, such as on the illustrated keyboard shown in Fig. 4 which shows forty-two character keys, notches 118 and the characters on matrix 108 are accordingly arranged to accommodate the number of characters selectable while leaving blank matrix spaces for those characters not used.

It also is evident that the solenoid actuated stop assembly A covers only a semi-circular pattern or 180° (the number of spaces between the fifteen solenoids, namely fourteen multiplied by 12 degrees, plus the four degree shift each way). Ordinarily if there were only one indexing contact, it would sweep in either a clockwise or counterclockwise direction until stopped by an actuated stop bar 46, and thus be able to stop shaft 53, and hence matrix 108, in a circumferential area covering only the 180 degrees covered by assembly A. This, of course, would afford no means to position one-half of the exposure characters for photographing.

To overcome this difficulty, the two indexing contacts 92 and 93 are provided, 180° apart. There is further provided an effective electrical control circuit which allows either one of the indexing contacts to control positioning of the indexing mechanism. Assuming that contact 92 controls positioning of exposure characters on matrix 108 corresponding with the lower case characters selectable on the typewriter keys 37, and further assuming that the apparatus is set as shown in Fig. 2, then by depressing a proper key 37 stop bar 46N is projected forward to contact directional contact segment 90. This energizes drive solenoid 80 to rotate the indexing assembly through shaft 53 in a clockwise direction until indexing head contact 92 contacts the actuated bar 46N, after which solenoid 80 is de-energized and the accurate positioning and photographing of the selected lower case character takes place.

Consider now the effect if the same key 37 had been depressed to photograph an upper case character. First, by depressing the shift key 40 to achieve upper case printing, the electrical circuit to energize solenoid 81 is completed, as described hereinafter. Thus, the same stop bar 46N contacting directional contact segment 90 now causes shaft 53 to rotate in a counterclockwise direction until indexing contact 93 engages the actuated bar 46N. This positions the indexing assembly A, and hence matrix 108, in a position 180° displaced from their position for exposing the lower case letter.

Since each key 37 is capable of selecting both an upper and a lower case character, the corresponding upper and lower case characters are 180° displaced from each other on matrix 108 and are positioned for photographing in the same manner as described. With the two indexing heads, 92 and 93, and the necessary electrical circuitry, it thus is possible to index matrix 108 throughout a 360 degree circumferential sweep to expose any character thereon, using an indexing stop assembly A covering only 180 degrees. Thus, all ninety characters, the forty-five upper case and the forty-five lower case, on matrix disc 108 are positionable for photographing. The previously described arrangement of indexing heads and directional segments further provides the shortest circumferential travel from any position to the position for the next selected character, with rotation never being more than 180 degrees for positioning successive characters. Such a feature greatly increases the speed at which the apparatus may be operated.

Arrangement of matrix characters

Since there are no rigid connections between the parent machine and the photocomposer, the characters on matrix 108 may be so arranged as to facilitate rapid operation. To this end, either of two factors may be considered in arranging the matrix characters.

The first factor considers matrix character arrangement so that the most frequently used characters require the operation of the least amount of apparatus for indexing. Specifically, the characters may be so arranged that the most frequently used characters do not require the energization of either of the shift solenoids 55A, 55B, but rather are indexed with stop assembly A maintained in its centered position, as shown in Figs. 2 and 9. This is exemplified by Table I which shows the relationship between characters and the shift solenoids, and in which $L_1$ is the most frequently used letter, $L_{26}$ the least frequently used letter, $P_1$ the most frequently used punctuation mark, and $P_9$ the last frequently used punctuation mark.

TABLE I

| | | | | | | | | | | | | | | | |
|---|---|---|---|---|---|---|---|---|---|---|---|---|---|---|---|
| Solenoid 55A | $L_{25}$ | $L_{22}$ | $L_{18}$ | $L_{14}$ | $L_{11}$ | $L_{13}$ | $L_{16}$ | $L_{20}$ | $L_{24}$ | $P_5$ | $P_6$ | $P_8$ | 7 | 2 | 4 |
| Center | $L_9$ | $L_7$ | $L_5$ | $L_3$ | $L_1$ | $L_2$ | $L_4$ | $L_6$ | $L_8$ | $P_1$ | $P_2$ | $P_3$ | 1 | 0 | 5 |
| Solenoid 55B | 9 | $L_{23}$ | $L_{19}$ | $L_{15}$ | $L_{10}$ | $L_{12}$ | $L_{17}$ | $L_{21}$ | $L_{25}$ | $P_4$ | $P_7$ | $P_9$ | 8 | 3 | 6 |

As is obvious from Table I, the most frequently used letters do not require the use of the shift solenoids, and the most frequently used letters are grouped as close to $L_1$ as possible. From Table I, it follows that the characters are arranged around matrix 108 in the following order: 9, $L_9$, $L_{26}$, $L_{23}$, $L_7$, $L_{22}$, $L_{19}$, $L_5$, $L_{18}$, $L_{15}$, $L_3$, $L_{14}$, $L_{10}$, $L_1$, $L_{11}$, $L_{13}$, $L_2$, etc.

The second factor which may be considered when arranging the matrix characters places emphasis on the desire to lessen matrix movement; that is, to group the most frequently used characters as closely as possible, regardless of the use of either shift solenoid. This is shown in Table II for the letters only.

TABLE II

| Solenoid | | | | | | | | | |
|---|---|---|---|---|---|---|---|---|---|
| 55A | $L_{23}$ | $L_{17}$ | $L_{11}$ | $L_5$ | $L_2$ | $L_8$ | $L_{14}$ | $L_{20}$ | $L_{26}$ |
| Center | $L_{25}$ | $L_{19}$ | $L_{13}$ | $L_7$ | $L_1$ | $L_6$ | $L_{12}$ | $L_{18}$ | $L_{24}$ |
| Solenoid 55B | | $L_{21}$ | $L_{15}$ | $L_9$ | $L_3$ | $L_4$ | $L_{10}$ | $L_{16}$ | $L_{22}$ |

Punctuation marks may be included among the letters shown in Table II in accordance with frequency of use. From Table II it follows that the letters are arranged around matrix 108 in the following order: $L_{25}$, $L_{23}$, $L_{21}$, $L_{19}$, $L_{17}$, $L_{15}$, $L_{13}$, $L_{11}$, $L_9$, $L_7$, $L_5$, $L_3$, $L_1$, $L_2$, etc.

Operation and circuit diagram

Figure 13:
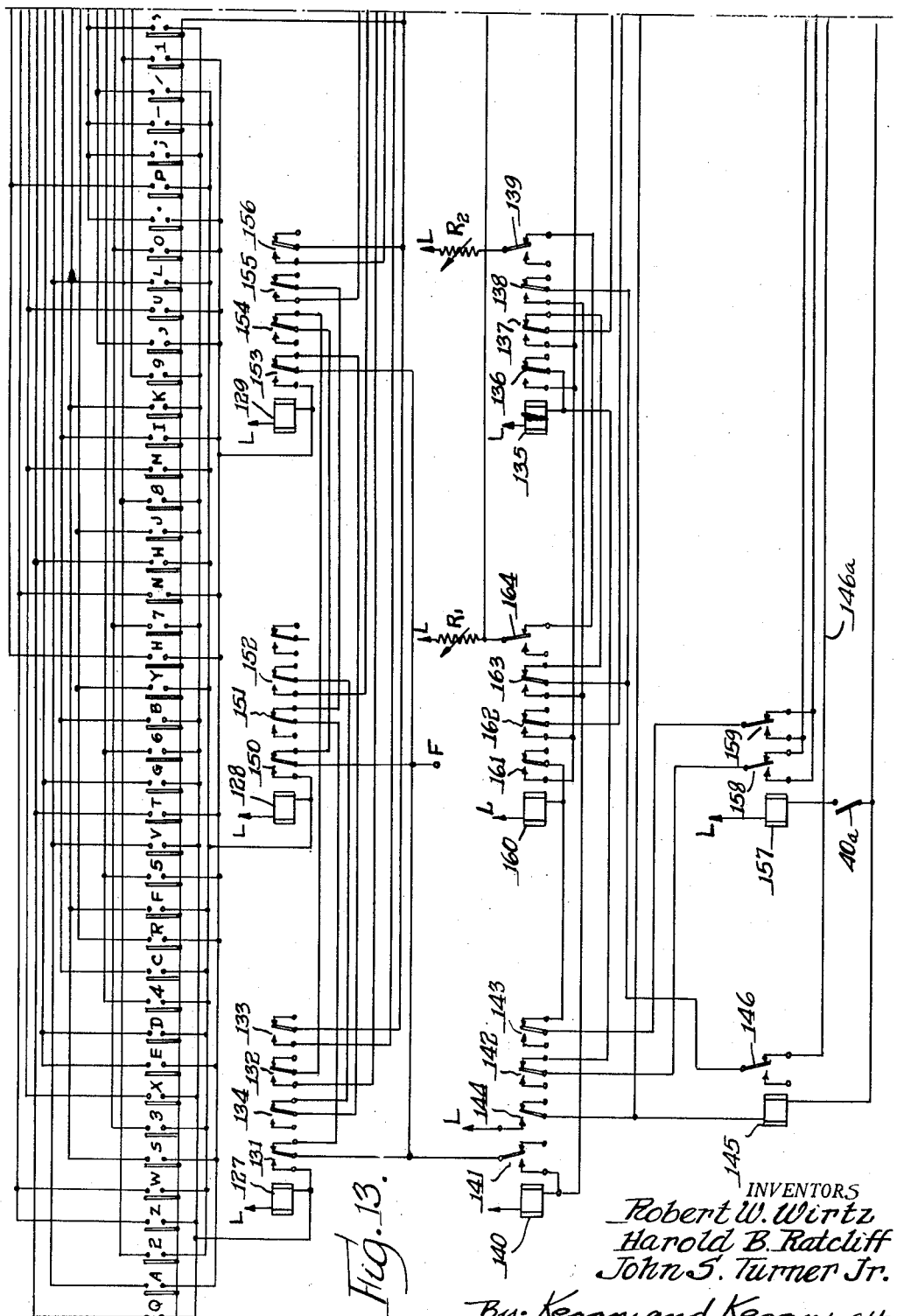
Figures 13 and 14 are circuit diagrams showing in a schematic way a preferred form of control circuit for operating the positioning solenoids, together with certain mechanisms, constructed and arranged in accordance with this invention.
Figure 14:
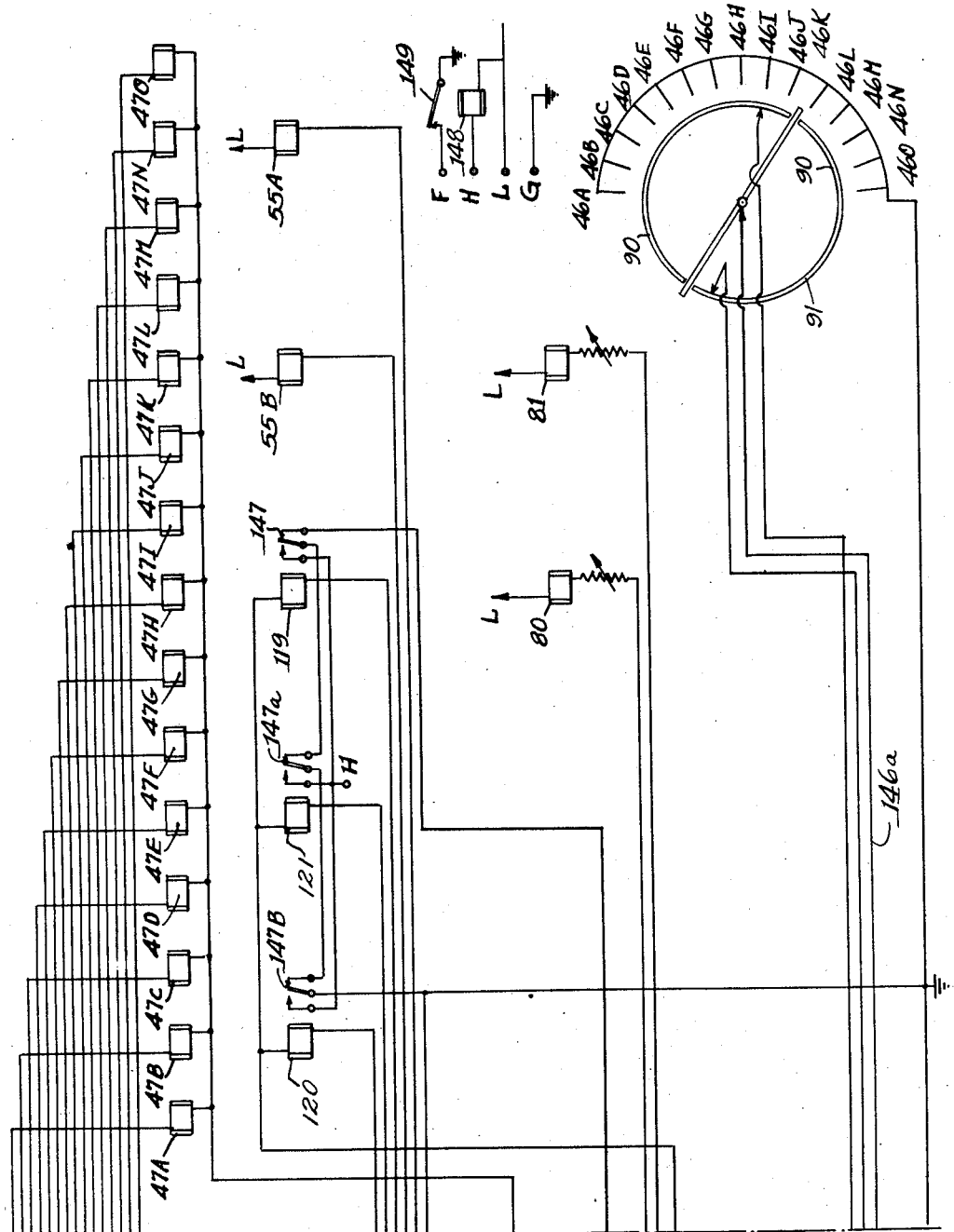

As seen in Figs. 13 and 14, the directional contacts 90, 91, are connected by means of alternative drive circuits with drive solenoids 80, 81, so that the directional contacts serve as the control means for determining the directions of rotation by shaft 53. In turn, each stop bar 46, when actuated, serves to complete a circuit from ground through one of the alternative drive circuits to energize that drive solenoid which enables an indexing head 91 or 92 (depending upon whether an upper or lower case character is selected) to travel directly toward the actuated stop bar with minimum movement.

Referring to Fig. 14, by way of example, actuation of stop bar 46M causes it to engage directional contact 91, whereupon shaft 53 and the indexing assembly are rotated until one of the indexing heads engages the actuated stop bar, as explained more fully hereinafter. If, instead, stop bar 46D had been actuated, it would have engaged segment 90, thereby causing rotation of shaft 53 and the indexing assembly in an opposite direction. In either case, once rotation of shaft 53 and the indexing assembly is arrested, and the entire cycle completed, the apparatus is immediately prepared in its new position, for the next character selection. No "homing" movement is necessary.

Figs. 13 and 14 further show that by depressing any character key 37 two circuits are closed. The first circuit energizes one of the indexing solenoids 47, while the second circuit energizes one of three control relays, 127, 128, or 129. Also, it further is seen that the circuits are so arranged that a separate and distinct one-third of the character keys control the energization of each control relay. Relays 127, 128 and 129 control the operation of latch solenoids 119, 120 and 121, respectively. Moreover, relays 127 and 129 further control the operation of shift solenoids 55A and 55B, respectively. Thus, each of the shift solenoids depends upon operation of one-third of the character keys for energization, while the remaining one-third of the character keys allow shift mechanism B to remain as shown in Figs. 2 and 9.

The intermediate ones of the fifteen solenoids 47 shown in Fig. 14 are each controlled by three character keys, while the extreme left hand solenoid 47 is controlled by two character keys and the extreme right hand solenoid is controlled by only one character key. While this adds up to a total of forty-two character keys, or the number thereof shown in Fig. 4, it is obvious that the apparatus is readily adaptable to instances where there are more than forty-two keys. Any additional keys merely are so wired as to control either of the end solenoids 47 shown in Fig. 14, and to control operation of one of the control relays. Thus, the herein disclosed indexing apparatus may be used with a wide variety of keyboards having different numbers of character keys.

For the purpose of explanation, the character keys 37 are considered as being divided into three groups according to which one of the three control relays 127–129 each key controls. The keys within each group control much the same electrical circuitry, although, of course, each key is capable of indexing matrix 108 into a different position.

Power is supplied to the apparatus through terminals L and G. For the purpose of this exposition drive motor 65 may be considered as running continuously, since energization of solenoids 80 and 81 determines the direction in which the apparatus rotates.

Assuming that a character key in the first group, such as the key for the letter "z," is depressed, it completes two circuits. The first circuit energizes solenoid 47B. The second circuit energizes control relay 127.

The fifteen solenoids 47 have some resistance in their common lead. The resistor R1, however, which is connected in series with each solenoid 47, is adjustable to make certain that any solenoid is energized when the electrical circuit thereto is completed. Resistor R2, in parallel with R1, assures that a positive pulling action of the solenoid actuated stop bar 46 is made. After the actuated stop bar 46 contacts the directional contact segment positioned therebefore and rotation of the indexing heads is started, R2 is cut out of the electrical circuit, as explained more fully hereafter. In this manner, the effect of friction between the turning directional segment and the stop bar 46 energized therewith is reduced.

Energization of the control relay 127 operates four sets of contacts. Single-pole double-throw contacts 131 afford an electrical interlock or holding circuit for the energized relay, through terminal F. Normally open contacts 132 close, so that latching solenoid 119 later may be energized. Normally open contacts 133 close to energize the shift solenoid 55A. Energization of solenoid 55A, as explained, shifts assembly A four degrees clockwise to the position shown in Fig. 10. The single-pole double-throw contacts 134 interlock relay 127 with relays 128 and 129 so that neither of the remaining control relays can be energized after the first control relay is energized.

As solenoid 47B is energized, stop bar 46B is projected forward until it contacts the directional contact positioned before it, which in this example is contact 90. This completes an electrical circuit to energize the clockwise drive relay 135. Relay 135 controls four sets of contacts. Normally open contacts 136 afford a holding circuit for the relay so that even if stop bar 46B loses contact with directional contact 90, relay 135 remains energized. Contacts 137 complete the electrical circuit to energize motor drive solenoid 80 and thus operatively connect shaft 53 with drive motor 65. Normally open contacts 138 close for a purpose hereinafter explained, and normally closed contacts 139 open to cut out resistor $R_2$ from the operating circuit of solenoid 74B.

The clockwise rotation of shaft 53 and the apparatus mounted thereon continues until one of the indexing heads, 92 and 93, strikes the actuated stop bar 46B. This completes an electrical circuit from ground, through closed contacts 138, to energize a position indicating relay 140. Relay 140 also controls four sets of contacts. The first set, normally open contacts 141, afford a holding circuit for relay 140, through grounded terminal F. The second and third sets, normally closed contact pairs 142 and 143, open to break the electrical circuits from the directional contacts 90, 91, to the drive relays. And the fourth set of contacts, normally open contacts 144, close to complete a circuit from ground, through closed contacts 132, to energize solenoid 119 and lock the selected matrix character in place for photographing. Contacts 144, when closed, also complete the circuit necessary to energize an auxiliary relay 145.

Auxiliary relay 145, when energized, opens a pair of normally closed contacts 146 to disconnect the indexing heads, 92 and 93, and line 146a leading thereto, from the remainder of the apparatus. In this manner, jamming of the indexing heads and undesirable repetitions are eliminated.

Referring again to latching solenoid 119, as the locking plunger 122 moved thereby enters a notch 118 aligned with the plunger and accurately positions the selected character at the exposure area ES, it operates the single-pole double-throw contacts 147. As contacts 147 are operated from their normal position, they break the circuit to clockwise drive relay 135, which when de-energized allows contacts 137 to open and thereby de-energize motor drive solenoid 80 and effectively disconnect shaft 53 from motor 65. Contacts 147, further, near the end of the travel by plunger 122, complete a circuit through terminal H to energize a shutter solenoid or other device 148 and thus photograph the selected character.

After the shutter is tripped, the plunger of solenoid 148 opens contacts 149, thereby breaking the electrical circuit for position indicating relay 140. This opens the energizing circuits to latching relay 119 and auxiliary relay 145, and permits control relay 127 to be de-energized, assuming that the actuated character key has been released. Opening of contacts 132 assures that the circuit to latching solenoid 119 is broken, allowing locking plunger 122 to return to its normal unactuated position. This further allows shutter solenoid 148 to be reset in readiness for the next character selection. De-energization of control relay 127 further opens contacts 133 to de-energize shift solenoid 55A so that it may return assembly A to the position shown in Figs. 2 and 9. Release of the actuated key further de-energizes solenoid 47b to thus reset the entire apparatus for the next character selection.

Consider now what happens when a key in the second group of keys, such as the key for the letter "d," is depressed. It closes a first circuit to energize one of the solenoids 47, which in this case is solenoid 47E. The second circuit completed by the keying operation energizes control relay 128, which establishes a holding circuit through the contacts 150. A second pair of contacts 151 interlock the control relays to prevent energization of the other two control relays until the initiated cycle is completed. Normally open contacts 152 close to prepare a circuit for the later energization of latching solenoid 120. The remainder of the cycle is similar to that previously described, with the exception that when control relay 128 is energized, the shift mechanism B is not operated.

Similarly, depressing a character key in the third group of keys, such as the key for the letter "s," energizes one of the indexing solenoids, in this case solenoid 47H, and further energizes control relay 129. Relay 129 locks itself in through contacts 153, while contacts 154 interlock the control relays to prevent energization of the other two control relays. Contacts 155, like contacts 132 and 153, partially complete the electrical circuit for the respective latching solenoid controlled by relay 129 so that solenoid 121 later may be energized. And, contacts 156 close to energize shift solenoid 55B. Again, the remander of the cycle is much the same as that previously described.

As previously pointed out, there are two indexing heads, 92 and 93. One senses the position of the indexing mechanism for lower case letters, while the second senses the position of the indexing mechanism for upper case letters. Assuming that the previous exposition covers the operational sequence for positioning lower case characters, to position upper case characters first the shift key 40 is depressed, as is ordinarily done to print upper case characters. This closes switch 40a and energizes a shift relay 157, thereby reversing the position of the contacts 158 and 159, whereby directional contact 90, which was previously connected with clockwise drive relay 135, now is connected with counterclockwise drive relay 160. Also, directional contact segment 91, which was previously connected with relay 160, upon depression of shift key 36, is connected to relay 135.

Counterclockwise drive relay 160, in turn, upon being energized by operation of a character key which causes a stop bar 46 to strike contact segment 90, is locked in by closing of its normally open contacts 161. Normally open contacts 162, upon closing, energize drive solenoid 81, effectively connecting shaft 53 to drive motor 65, whereby shaft 53 is rotated in a counterclockwise direction. Contacts 163, which serve a function similar to that served by contacts 138, partially complete a circuit for the eventual energization of relay 140. And, contacts 164, upon relay 160 being energized, open to cut out resistor $R_2$. The operation of the apparatus is the same as that described for positioning any lower case character, with the exception that now relay 160 controls the direction in which shaft 53 rotates. Release of shift key 40 allows the indexing apparatus to again position matrix 108 for photographing lower case characters.

It may happen that an actuated stop bar 46 may come into direct contact with the indexing head positioned before it, with the result that the stop bar is prevented from engaging one of the directional contact segments, 90 or 91, also positioned therebefore. This is most likely to occur, of course, when successive characters are the same, whether they are in the same or different cases. In order that the machine may properly respond to print an upper or lower case character, as the operator desires, with proper operation of drive relay 135 or 136 and energization of position indicating relay 140, a direct connection is provided from the indexing heads, through line 146a, and contacts 163 and 137, to the clockwise-drive solenoid 80, whereby drive solenoid 80 is immediately energized to temporarily rotate shaft 53 until the actuated stop bar 46 can contact the directional segment positioned before it, after which the proper drive circuit is completed for positioning the selected character.

It is pointed out that even if a depressed key is held down over an extended period of time, recycling is prevented by the described circuits. Assuming that the key for the letter "z" is held down, solenoid 47B and control relay 127 remain energized. Also, position indicating relay 140 remains energized through the contacts 131 and the actuated key contact. This, in turn, maintains the actuated latching solenoid 119 energized to thus prevent resetting of the contact pairs 147 controlled thereby. As long as one of the contacts 147 remains actuated, shutter solenoid 148 remains energized so that repeat functioning of the shutter is prevented.

Moreover, as long as position indicating relay 140 is energized, contacts 142 and 143 remain open to break all circuits to the de-energized drive relays 135 and 160 to thus prevent their energization. With contacts 146 maintained open by energized auxiliary relay 145, and latching solenoid 119 maintaining its respective contacts 147 actuated, the circuits to both drive solenoids 80 and 81, are broken, so that shaft 53 remains disconnected from drive motor 65.

Only after shutter solenoid 148 allows contact 149 to close again, and after the actuated key is released, is the apparatus allowed to reset for the succeeding character selection. Until both steps occur, further character indexing is prevented.

It is to be distinctly understood that the apparatus shown and described herein is a preferred embodiment which has been given by way of example only, and that various changes and rearrangements of the details shown may be made without departing from the spirit of the invention, the scope of which is defined in the appended claims.

We claim:

1. Keyboard controlled apparatus for selectively moving a character-bearing plate, characterized by the fact that a plurality of predetermined plate positions corresponding to the character keys of a keyboard are determined by a lesser number of positioning means, comprising a rotatable carriage for said plate, a drive connected with said carriage, an arm rotatable with said carriage for setting the position of said carriage, a plurality of positionable stops arranged in an arc adjacent the path of movement of said arm, a plurality of actuators, one for each stop whereby each stop is individually positionable into the path of said arm to halt the rotation thereof, means effective to energize said drive upon operation of any actuator, a member whereby the stops may be angularly positioned simultaneously and to the same extent, means normally retaining said member in a center position, shift means for selectively angularly moving said member in either one of opposed directions from said center position, means connected with said member for limiting the effective movement thereof in either of said opposed directions, and electrical control means, controlled by said character keys, for selectively operating said actuators and said shift means according to the predetermined position which said plate is to assume for each character key operation.

2. Keyboard controlled apparatus for selectively moving a character-bearing plate, characterized by the fact that a plurality of predetermined plate positions corresponding to the character keys of a keyboard are determined by a lesser number of positioning means, comprising a carriage for said plate, a reversible drive connected with said carriage, a pair of contact segments for determining the direction of carriage movement, an arm for setting the position of said carriage, means connected with said carriage and movable therewith to carry said arm and said segments one on one side of said arm and the other on the other side of said arm, means connecting said segments with said drive for selectively moving said carriage in either one of opposed directions, a plurality of stops, each movable to a position to strike a segment and be engageable with said arm to halt said carriage, actuating means for individually positioning any stop, a member whereby the stops may be positioned simultaneously and to the same extent, shift means for selectively moving said member from a center position in either one of opposed directions, means for limiting the effective movement of said member, and electrical control means, controlled by keyboard character keys, for selectively operating said actuating means and said shift means according to the predetermined position said plate is to assume, whereby operation of a keyboard key causes said plate to be driven towards that predetermined position representing said key, said plate movement ending upon said arm engaging the stop positioned by the keying operation.

3. Apparatus as described in claim 2 wherein said arm is movable relative to said carriage, and further characterized by the fact that the plate is precision locked at said predetermined position regardless of the direction from which said arm approaches said moved stop, said apparatus additionally comprising limit means connected with said carriage for limiting the relative movement between said arm and said carriage, a disc rotatable with said carriage and having a plurality of flared passages about its periphery, locking means engageable in any passage aligned therewith to impart differential movement to said disc and said carriage independent of said drive and while said arm engages said moved stop, means to trip said locking means, and means connecting the latter means with said arm, whereby said locking means is tripped upon said arm striking said moved stop, and said disc and carriage are moved slightly until the terminal end of said locking means engages the terminal end of the passage in which it is engaged.

4. Apparatus as described in claim 3 and additionally including control means connected with said reversible drive, and electrical circuit means connecting said control means and said locking means, whereby said control means deactuates said drive contemporaneously with actuation of said locking means, thereby effectively freeing said carriage from the influence of said drive.

5. Apparatus comprising a positionable character-bearing plate, a rotatable carriage for said plate, a pair of wheels positioned to turn said carriage in opposite senses, a motor to turn said wheels, means to releasably maintain said wheels disengaged from said carriage, first means to engage one of said wheels with said carriage, second means to engage the other of said wheels with said carriage, means interlocking said wheels whereby not more than one wheel can engage said carriage at any given time, a pair of contact segments for determining the direction of carriage rotation, an arm for setting the angular position of said carriage, means rotatable with said carriage to carry said arm and said segments one on one side of said arm and the other on the other side of said arm, a first circuit connecting said first means and one of said segments, a second circuit connecting said second means and the other of said segments, a plurality of positionable stops arranged in an arc adjacent said arm and said segments, a plurality of stop solenoids, one for each stop whereby each stop is individually positionable to engage one of said segments, close the circuit connected thereto, and engage with said arm to halt said carriage, a member whereby the stops may be angularly displaced simultaneously and to the same extent, means normally retaining said member at a center position, a first shift solenoid for rotating said member in a first direction from said center position, a second shift solenoid for rotating said member in a second direction from said center position, means for limiting the effective drive of said shift solenoids, electrical circuit means controlled by a keyboard for selectively energizing any stop solenoid alone or in combination with a shift solenoid according to a predetermined position which said plate is to assume, whereby operation of a keyboard key causes said plate to be driven toward a predetermined position corresponding to said key, said rotation ceasing upon said arm engaging the stop actuated by said keying operation.

6. The apparatus described in claim 5 and additionally comprising a disc connected with said carriage, rotatable therewith, and having a plurality of notches about its periphery, each predetermined position corresponding to one of said notches, means to enter any notch aligned therewith, and circuit means connecting the latter means with said arm, whereby upon said arm engaging said actuated stop, said circuit means is closed to actuate said latter means to thereby lock said carriage in position, and means controlled by said latter means for contemporaneously releasing said carriage from the influence of said motor as said latter means is actuated.

7. Keyboard controlled apparatus for selectively positioning a character-bearing plate whereby each time a keyboard character key is actuated a corresponding plate character is selectively positioned, comprising a drive motor, a shaft rotated thereby, a carriage for said plate, a pair of wheels turned by said shaft, a first actuator to engage one of said wheels with said carriage and turn said carriage in a first direction, a second actuator to engage the other of said wheels with said carriage and turn said carriage in a second direction, means connected with said wheels whereby not more than one wheel engages said carriage at any time, a pair of contact segments for determining the direction of carriage rotation, a pair of arms extending in opposed directions from each other for setting the angular position of said carriage, means, rotatable with said carriage, for carrying said arms and said segments, one on one side of each of said arms and the other on the other side of each of said arms, a first circuit for connecting one of said segments with said first actuator to move said carriage in said first direction, a second circuit for connecting the other of said segments with said second actuator to move said carriage in said second direction, a plurality of radially positionable stops arranged in an arc adjacent said arms and said segments, a plurality of stop actuators, one for each stop, whereby each stop is individually radially positionable to (a) engage the segment aligned therewith, (b) close the circuit connected to the engaged segment and the actuator controlled thereby, and (c) engage one of said arms to halt rotation of said carriage, a member whereby the stops may be angularly displaced simultaneously and to the same extent, means for retaining said member at a center position, a first shift actuator for rotating said member in a first sense from said center position, a second shift actuator for rotating said member in a second sense from said center position, means for limiting the effective drive of said shift actuators, whereby the stops are positionable through an arc spanning approximately 180 degrees and are positionable to predetermine a position for each keyboard character key, circuit means, controlled by the keyboard character keys, for selectively operating said stop actuators and said shift actuators according to the predetermined position which said plate is to assume for each keyboard keying operation, and means controlled by a keyboard shift key for reversing the circuits connecting said segments and said first and second actuators whereby one of said arms is effective to halt rotation of said carriage for upper case character selections while the other of said arms is effective to halt carriage rotation for lower case character selections.

8. Apparatus as described in claim 7 wherein said arms are movable relative to said carriage, and said carriage is precision locked at each predetermined position it assumes, regardless of the direction from which the arms approach positioned stops, said apparatus additionally comprising limit means connected with said carriage for limiting relative movement between said arms and said carriage, a disc rotatable with said carriage and having a plurality of uniformly spaced flared notches about its periphery, a set of locking probes engageable in said notches, said notches and said locking probes being so arranged that said character-bearing plate is lockable in approximately ninety uniformly spaced positions, an actuator for each probe, control means controlled by said character keys for selectively tripping said probe actuators whereby no more than one is tripped at any one time, and means connecting said arms with said probe actuators, whereby engagement by an arm with a positioned stop trips a probe actuator preselected by said control means to move the probe actuated thereby into engagement with a notch positioned therebefore, thereby imparting accurate positioning movement to said carriage independent of said drive, said accurate positioning movement ceasing upon the terminal end of said actuated probe striking the terminal end of the notch wherein it is engaged.

9. Apparatus as described in claim 8 and additionally including a second control connected with said first and second actuators, and further circuit means connecting each probe actuator with said second control, whereby said second control breaks the circuits to said first and second actuators to thereby free said carriage from the influence of said motor contemporaneously with the tripping of any probe actuator.

10. Apparatus characterized by the fact that positioning mechanism defining an approximately semi-circular pattern positions a character-bearing plate at any one of a plurality of predetermined positions defining an appropriately circular pattern, comprising a rotatable carriage for said plate, a reversible drive connected with said carriage, a pair of elements for determining the direction of carriage rotation, a pair of arms extending in opposite directions from each other for setting the angular position of said carriage, means connected with said carriage carrying said arms and said elements one on one side of each of said arms and the other on the other side of each of said arms, circuit means connecting one element to said drive to move said carriage in a first sense, circuit means connecting the other element to said drive to move said carriage in a second sense, a plurality of positionable stops arranged in an arc approximating 180 degrees adjacent said arms and elements, a plurality of actuators, one for each stop, whereby each stop is positionable to contact one of said elements, close the circuit means connected thereto, and engage with one of said arms to halt rotation of said carriage, means for selectively tripping the actuators, means for reversing the circuit means connecting said drive and said elements, and means for actuating said reversing means, whereby tripping of an actuator, with said reversing means actuated, positions said plate at a predetermined position opposed to that of another predetermined position whereat said plate is positionable when the reversing means is deactuated.

11. Apparatus whereby positioning mechanism defining less than a 180 degree arc positions a plate at any one of a plurality of predetermined positions defining a circular pattern, comprising a rotatable carriage for said plate, a reversible drive connected with said carriage, a pair of elements for determining the direction of carriage rotation, a pair of arms extending in opposed directions from each other for setting the angular position of said carriage, rotatable means connected with said carriage to carry said arms and said elements, one on one side of each of said arms and the other on the other side of each of said arms, circuit means connecting one element with said drive to move said carriage in a first sense, circuit means connecting the other element with said drive to move said carriage in a second sense, a plurality of radially positionable stops arranged in an arc adjacent said arms and said elements, said arc having a span not less than 90 degrees and not more than 180 degrees, a plurality of actuators, one for each stop whereby each stop is positionable to engage one of said elements, close the circuit means connected to the engaged element to move the carriage in the sense controlled by said element, and engage with one of said arms to halt rotation of said carriage, a member whereby the stops may be angularly displaced, simultaneously and to the same extent, shift means for rotating said member in either one of opposed directions, means for limiting the effective angular driving range of said shift means in either direction to one-half of an angular distance equal to 180 degrees less the span of said arc, means for selectively tripping the actuators and said shift means according to the predetermined position which said plate is to assume, means for reversing the circuit means connecting said drive and said elements, and means for actuating said reversing means, whereby tripping of an actuator, with said reversing means actuated, positions said plate at a predetermined position opposed to that of another predetermined position whereat said plate is positionable when the reversing means is deactuated.

12. Keyboard actuated apparatus for positioning a character-bearing plate with minimum movement directly from each character-producing position to the next succeeding character-producing position, comprising a rotatable shaft for turning said plate, a reversible drive connected with said shaft, a protruding member on said shaft for setting the angular position thereof, a pair of semi-circular contact segments for determining the direction of shaft rotation, one on each side of said member and movable therewith, circuit means between said drive and one segment to energize said drive for moving said shaft in a first sense, circuit means between the other segment and said drive to energize said drive for moving said shaft in a second sense, a plurality of stops arranged in an arc adjacent said member and segments, a plurality of solenoids, one to move each stop to contact either segment and be engaged by said member, electrical control means controlled by a keyboard, to selectively energize said solenoids, whereby each keyboard key actuates a predetermined solenoid to move the corresponding stop to contact the directional segment position nearest thereto, thereby closing a circuit to said drive to turn said shaft in that predetermined sense controlled by said segment, said rotation ceasing upon said member striking the moved stop.

13. The apparatus of claim 12 wherein the arc spanned by said stops defines an approximately semi-circular pattern, and additionally including a second protruding member carried by said shaft on the opposite side thereof from said protruding member, means for reversing the circuit connections between said segments and the reversible drive, and means, controlled by a keyboard key, for actuating said reversing means, whereby the pattern of the character-producing positions assumable by said plate defines a circular pattern.

14. Reversible drive mechanism for positioning a matrix, comprising a motor, a shaft rotated thereby, a second rotatable shaft to carry the matrix, a turntable to turn said second shaft, a lever, a pair of friction wheels turned by said first shaft and positioned on said lever to turn said turntable in opposite senses, an arm to rock said lever, spring means acting on said arm to normally maintain both wheels disengaged from said turntable, a pair of coils, associated with said arm, electrical circuit means, controlled by a keyboard, for selectively energizing said coils according to the direction which said matrix is to turn, whereby energization of one coil moves said arm in a first direction, causing one of said friction wheels to engage said turntable to rotate said matrix in a first sense, and energization of the other coil moves said arm in a second direction to cause the other of said friction wheels to engage said turntable and rotate said matrix in a second sense.

15. The apparatus described in claim 14 and additionally including apparatus to lock said second shaft upon said matrix achieving a predetermined position, comprising a locking disc rotatable with said second shaft, said locking disc having a plurality of notches about its periphery, a locking solenoid, means to energize said locking solenoid as said matrix reaches said predetermined position, a plunger actuatable by said locking solenoid to engage a notch positioned therebefore and lock said matrix in place, and connecting means between said coils and said locking solenoid whereby energization of said locking solenoid contemporaneously de-energizes an energized coil to disengage the friction wheels from said turntable and free said second shaft from driving torque.

16. Keyboard actuated apparatus for selectively stopping a positionable matrix at any one of a plurality of predetermined locations, each of said predetermined locations corresponding to a given one of the matrix characters and the positioning thereof for reproduction, comprising: a movable member connected with said matrix for determining the positioning thereof, a plurality of stops, less in number than said predetermined locations, each of said stops being positionable into the path of said member, first means whereby the stops all may be displaced simultaneously and to the same extent, a plurality of actuating means, one for each stop, whereby each stop may be positioned individually into the path of said member to be struck thereby and arrest said matrix, second means normally retaining said first means in a center position, shift means for moving said first means in either one of opposed directions from said center position, means for limiting the effect drive of said shift means, and circuit means, selectively controllable by a keyboard, for tripping said actuating means and said shift means according to the predetermined position said matrix is to assume.

17. The apparatus of claim 16 characterized by the fact that the stops are uniformly angularly spaced from the stops adjacent thereto by a first angular distance, and the effective movement of said first means in either of said opposed directions is equal to one-third of said first angular distance, whereby the angular distance between adjacent predetermined stop positions is uniform.

18. Keyboard actuated apparatus wherein a plurality of stops are selectively positionable to stop a rotating matrix at any one of a larger number of predetermined character reproducing locations, each of said predetermined locations corresponding to a related one of the matrix characters and the positioning thereof for reproduction, comprising: a rotatable shaft for the matrix, an arm rotatable with said shaft, a plurality of radially positionable stops arranged to form an annular pattern concentric with said shaft, each of said stops being selectively movable to a position whereat it may intercept the travel of said arm, a member whereby the stops may be angularly displaced simultaneously and to the same extent with respect to said shaft, a plurality of stop solenoids, one for each stop, whereby each stop may be individually radially moved with respect to said shaft for engagement with said arm, means for normally retaining said member at a center position, a first shift solenoid for displacing said member in a first sense from said center position, a second shift solenoid for displacing said member in a second sense from said center position, means for limiting the effective drive of either shift solenoid, and electrical circuit means, controlled by a keyboard, for selectively energizing said stop solenoids and said shift solenoids according to the predetermined position which said matrix is to assume.

19. Keyboard actuated apparatus for indexing a character-bearing plate directly from each character reproducing position to the next succeeding character producing position, comprising: a keyboard having a plurality of selectively operable character keys, one for each plate character, a plurality of stops arranged in an arc, each stop being radially positionable with respect to said arc, contact means controlled by each character key, first means including actuating means controlled by said contact means whereby each keyboard character key controls the movement of a predetermined stop, a rotatable shaft centrally arranged with respect to said arc for turning said plate, a pair of electrical contact elements for determining the direction of shaft rotation, a member connected with said shaft for setting the angular position of said shaft and said plate, means on said shaft and in juxtaposition with said stops to carry said member and said elements one on one side of said member and the other on the other side of said member, a reversible drive connected with said shaft, circuit means between one element and said drive to energize said drive and rotate said shaft in a first direction, and circuit means between the other element and said drive to energize said drive and rotate said shaft in a second direction whereby operation of a character key moves the stop controlled thereby into engagement with the element positioned nearest thereto, closing a circuit to said drive and rotating said shaft in that direction controlled by said engaged element, said rotation ceasing upon said member striking said moved stop.

20. Apparatus as described in claim 19 wherein said member is movable relative to said shaft, and characterized by the fact that the plate is precision locked for character-producing regardless of the direction from which said member approaches said moved stop, said apparatus additionally comprising limit means connected with said shaft, means connected with said member and cooperable with said limit means for limiting the relative movement between said shaft and said member, a disc fixed to said shaft for rotation therewith and having a plurality of flared notches about its periphery, each plate character-producing position corresponding to one of said notches, means to enter the notch positioned therebefore and impart differential movement to said shaft and plate independent of said drive and while said member abuts said moved stop, and electrical circuit means connecting the latter means with said member to actuate said latter means upon said member engaging said moved stop, whereby said shaft and plate are rotated slightly until the terminal end of said latter means strikes the terminal end of the notch wherein it is moved, and means controlled by said latter means for contemporaneously releasing said shaft from the influence of said drive as said latter means is actuated.

21. Apparatus as described in claim 20, and additionally including further circuit means connected with said latter means, controlled thereby, and closed contemporaneously with said terminal ends striking each other, and control means connected to said further circuit means and common to all plate character producing positions for sequentially causing character production and subsequent deactuation of said latter means.

22. The combination with a keyboard, a positionable matrix having a set of characters thereon corresponding to the characters selectable on said keyboard, and drive mechanism whereby said matrix is driven from each character-producing position to the next succeeding character-producing position, of keyboard actuated apparatus for selectively positioning said matrix at any one of a plurality of predetermined positions, comprising a rotatable bar connected with said matrix to selectively determine said positions, first means for selectively connecting said bar to said drive mechanism, a plurality of contacts arranged around the periphery of the path of said bar, actuating means whereby any contact may be selectively projected into the path of said bar, second means whereby said contacts may be simultaneously angularly displaced to the same extent, circuit means, including contact means controlled by said keyboard, to selectively actuate said second means and said actuating means according to the predetermined character-producing position said matrix is to assume, third means connected with said first means and effective to actuate the same upon any contact being actuated, and circuit means closed upon said bar striking any contact for deactuating said first means and freeing said bar and said matrix from the effect of said drive mechanism.

23. The combination according to claim 22 and additionally including additional circuit means controlled by said keyboard contact means for insuring completion of an initiated cycle regardless of the release of the last keyboard character key operated or the operation of any other key, and means connected with said additional circuit means and effective to open said additional circuit means upon completion of the character reproduction operation.

24. Keyboard actuated apparatus for positioning a character plate, comprising a rotary switch including, a rotatable contact bar connected with said plate and a pair of semi-circular contact elements fixed one on each side of said bar, rotatable therewith and insulated therefrom, first circuit means including reversible drive means controlled by said semi-circular contact elements whereby said plate and said bar are driven in either one of opposed directions, a plurality of contacts arranged about the peripheral path of said semi-circular contacts, means controlled by said keyboard for selectively projecting any contact into engagement with the semi-circular contact element aligned therewith, to thereby close said first circuit means, energize said drive means, and move said plate and bar in that direction controlled by the engaged semi-circular contact element, and second circuit means closed upon said bar striking the selectively projected contact and including means for sequentially precision locking said plate in position, causing character-production, and contemporaneously freeing said plate and said bar from the driving influence of said drive means.

25. The combination according to claim 24 wherein said second circuit means includes a solenoid, a plunger actuatable thereby to lock said plate in any character-producing position, circuit means to energize said solenoid upon said bar striking said projected contactor, and control means connected with said solenoid, actuatable thereby to cause character-production and subsequently effective to open said circuit and de-energize said solenoid and enable apparatus reset for the next succeeding character producing operation.

26. Keyboard actuated apparatus for indexing a matrix having a set of reproducible characters thereon, each selectively positionable for reproduction at a predetermined location by selective operation of a corresponding keyboard character key, comprising: a movable carriage supporting said matrix, an arm connected with said carriage for setting the position thereof, a plurality of positionable stops, less in number than the character keys on said keyboard and arranged with respect to the path of said arm for selective projection into said path, a member whereby said stops may be shifted simultaneously and to the same extent, shift means cooperable with said member to cause said shifting, means limiting the effective drive of said shift means, a plurality of stop actuators, one for each stop whereby each stop is individually positionable into the path of said arm to halt the movement of said arm and said carriage, and electrical circuit means, controlled by the keyboard character keys, for selectively operating said actuators and said shift means according to the predetermined position said matrix is to assume for each character key operation.

27. Keyboard actuated apparatus for indexing a matrix having a set of reproducible characters thereon, each selectively positionable for reproduction at a predetermined location by selective operation of a corresponding keyboard character key, comprising: a rotatable carriage supporting said matrix; a reversible drive connected with said carriage; an arm connected with said carriage for setting the position thereof; a pair of directional contact segments for determining the direction of carriage rotation, said segments being fixed one at each side of said arm and movable therewith; first circuit means between said drive and one segment to energize said drive and rotate said carriage in a first sense; second circuit means between said drive and the other segment to energize said drive and rotate said carriage in a second sense; a plurality of positionable stops, less in number than the character keys on said keyboard, in juxtaposition with said segments for engagement therewith, and arranged with respect to the path of said arm for selective projection into said path; a member whereby said stops may be shifted simultaneously and to the same extent; shift means cooperable with said member to cause said shifting; means limiting the effect of said shift means; a plurality of stop actuators, one for each stop whereby each stop is selectively positionable (*a*) to engage the segment nearest thereto to energize said drive and (*b*) into the path of said arm to halt the rotation thereof, and electrical circuit means controlled by the keyboard character keys for selectively operating said actuators and said shift means according to the predetermined position said matrix is to assume for each character key operation.

28. Keyboard actuated apparatus for positioning a character-bearing plate directly from each character reproducing position to the next succeeding character reproducing position, comprising: a rotatable carriage for said plate, a reversible drive for turning said carriage; an arm connected with said carriage for setting the angular position thereof; a pair of substantially semi-circular contact segments for determining the direction of carriage rotation, one of said segments being positioned at one side of said arm, and the other of said segments being positioned at an opposed side of said arm, said segments being rotatable with said arm; first circuit means between said drive and said one segment to energize said drive for moving said carriage in a first sense; second circuit means between said drive and said other segment to energize said drive and move said carriage in an opposed sense; a plurality of stops in juxtaposition to said segments and arranged with respect to the path of said arm for selective projection into said path; a plurality of solenoids, one to move each stop to contact either segment and be engaged by said arm, electrical circuit means, controlled by a keyboard, to selectively energize said solenoids, whereby each keyboard character key actuates a predetermined solenoid to move the corresponding stop to contact the segment nearest thereto, thereby closing a circuit to said drive to turn said carriage in that predetermined sense controlled by the contacted segment, said rotation ceasing upon said arm striking the moved stop.

29. The apparatus of claim 28 and additionally including a second arm connected with said carriage and displaced from said first arm by approximately 180 degrees, means controlled by a keyboard shift key for reversing the circuit connections between said segments and said drive, whereby actuation of a predetermined solenoid, with the latter means actuated, positions said plate at a position substantially opposed to that position whereat said plate is positionable when said latter means is deactuated.

30. The apparatus of claim 28 wherein said carriage includes a circumferential surface having a plurality of notches therein, and additionally including a movable lock bar arranged to enter any notch aligned therewith, a solenoid to move said lock bar, additional circuit means connecting the latter solenoid with said arm, whereby upon said arm striking said moved stop, the latter circuit means is closed to energize said latter solenoid to move said lock bar and hold said carriage, and means controlled by said latter solenoid to break the circuit to said drive and release said carriage therefrom as said lock bar is moved.

31. Apparatus for selecting and positioning characters for reproduction at a character-reproduction position, comprising a matrix having two sets of characters thereon located on respective sections of the matrix, the characters of either set being dispersed on the matrix, within the pertaining matrix section, in positions corresponding respectively to the positions occupied by the characters of the other set within the other matrix section, character-selecting means common to the two sets of characters, means for operating the character-selecting means to effect selections in succession of the characters of a set, character-locating means, a shift device and means for operating it to select either set of characters to the exclusion of the other, means responsive to any said character selection for operating the character-locating means jointly according to (1) the character selected by the character-selecting means, and (2) the set of characters currently selected by the shift device, matrix-drive means controlled by the character-locating means for imparting a positioning movement to the matrix which depends upon the location within its set of the character selected and upon the character set which is selected, and which brings the characters of the character set selected by the shift device into association with the reproduction position to the exclusion of the other character set, and brings the selected character of the selected set into association with the reproduction position to the exclusion of the other characters of the same set, and matrix-arrest means also controlled by the character-locating means for terminating the movement of the matrix with the selected character of the selected set in its said association with the reproduction position.

32. Apparatus as described in claim 31, wherein a said positioning movement of the matrix brings characters of one set successively into association with the said reproduction position and, if not terminated, then brings the characters of the other set successively into association with the said reproduction position, and wherein, between successive said positioning movements, the matrix remains in the position to which last moved, means included in the said matrix-drive means for imparting the positioning movement to the matrix in opposed directions alternatively, and direction-selecting means for controlling the direction of the next said positioning movement of the matrix according to the identity of the last said position and according to the identity of the position of the matrix selected by the next operation of the said character-selecting means.

33. Apparatus as described in claim 32, wherein the said any positioning movement, unless sooner terminated, may again bring the said characters of the said one set successively into association with the said reproduction position, the said direction-selecting means including a pair of alternatively operable electro-responsive devices corresponding respectively to the said directions of positioning movement, with means responsive to the operation of either last said device for causing the positioning movement to occur in the direction to which the operated last said device corresponds, a pair of electrical circuits, means responsive to any said operation of the said character-locating means for rendering the electrical circuits effective alternatively according to the location within its said character set of the matrix character last positioned for reproduction with respect to the location within its set of the matrix character newly selected by the character-locating means, and means for interchangeably connecting the said electro-responsive devices respectively in the said electrical circuits according to which set of characters is currently selected by the said shift device, the electro-responsive device connected in the effective electrical circuit being thereby operated for the stated purpose.

34. Apparatus as described in claim 31, wherein the said matrix has no normal position and is allowed to remain, between successive said positioning movements, in the position to which last moved, and wherein any said positioning movement, unless sooner terminated, may bring all said characters into association successively with the said reproduction position, one said set after the other, the said matrix-drive means including two drive-control means which are separately operable to cause the said positioning movement of the matrix to occur in respective opposed directions, and direction-control apparatus and means for causing it to operate the drive-control means alternatively according to the position currently occupied by the matrix with reference to the position to which it must be moved to bring the currently selected character into reproduction position, the direction-control apparatus being so related to the two drive-control means that the drive-control means which is operated by the direction-control apparatus, when the newly selected character is in the same set as the preceding one, is the one which causes the matrix to move in the direction of least movement to position the newly selected character.

35. Apparatus as described in claim 34, wherein the said means for rendering the said positioning movement of the matrix dependent upon the set of characters currently selected by the shift device comprises a further direction-control apparatus, means controlled by the said shift device for placing the further direction-control apparatus in positions corresponding respectively to the said sets of characters, and means controlled by the last said direction-control apparatus in either said position thereof for reversing, with respect to the other said position thereof, the said relationship between the first said direction-control apparatus and the two said drive-control means.

36. Reversible drive mechanism for positioning a matrix, comprising a rotatable carriage for the matrix, a pair of friction drive wheels positioned to selectively engage and turn said carriage in either one of opposite senses, means to rotate said wheels continuously, means to releasably maintain said wheels disengaged from said carriage, electrical circuit means controlled by a keyboard and including actuating means effective to cause no more than one wheel to engage and drive said carriage at any time, a disc rotatable with said carriage and having a plurality of V-shaped notches in its circumferential face, positionable means engageable in any one of said notches as said matrix arrives at a predetermined position, and means interconnecting said actuating means and said positionable means whereby a wheel engaging and driving said carriage is disengaged therefrom contemporaneously as said positionable means engages a notch.

References Cited in the file of this patent

UNITED STATES PATENTS 2,207,265    Ogden _____ July 9, 1940